April 28, 1970  D. L. DEANE  3,508,745
ELASTOMERIC CLOSED END TRIPLE-RATE BUSHING
Filed July 13, 1967
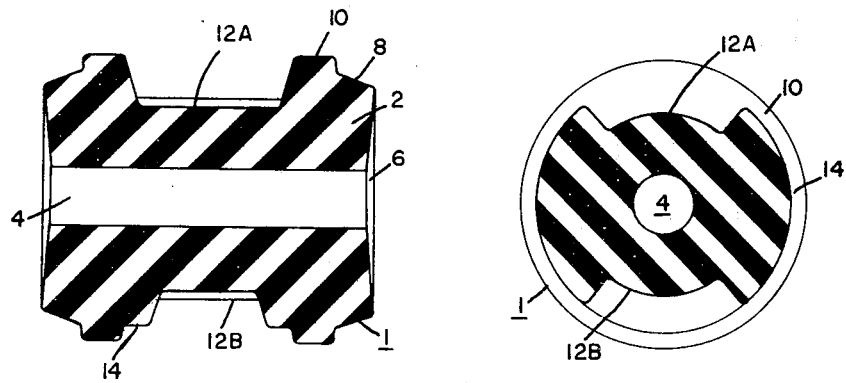
Fig 1   Fig 2
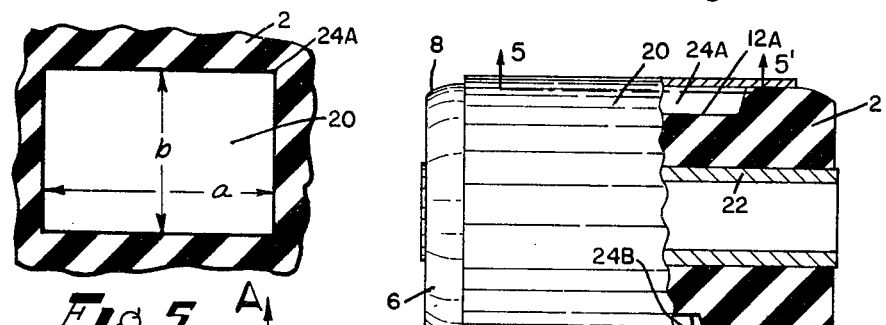
Fig 5   Fig 3
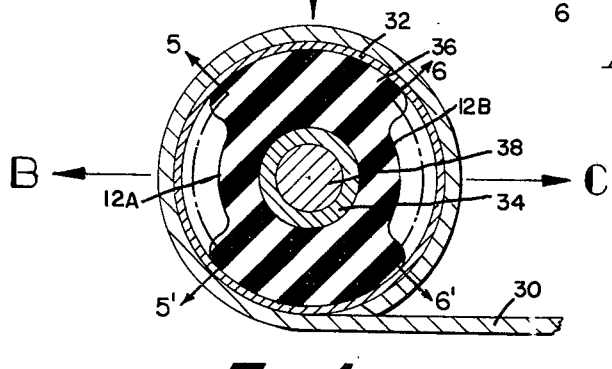   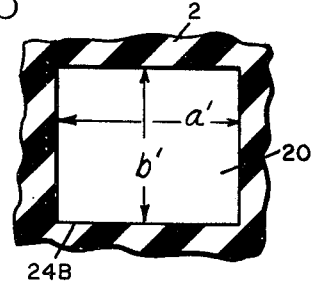
Fig 4   Fig 6
INVENTOR
DONALD L. DEANE
Frank J. Earnheart
BY James A. Lucas
ATTORNEYS United States Patent Office 3,508,745
Patented Apr. 28, 1970

3,508,745
ELASTOMERIC CLOSED END
TRIPLE-RATE BUSHING
Donald L. Deane, Logansport, Ind., assignor to General
Tire & Rubber Company, a corporation of Ohio
Filed July 13, 1967, Ser. No. 653,213
Int. Cl. B60g *11/42;* F16f *1/16, 1/52*
U.S. Cl. 267—57.1                                3 Claims

ABSTRACT OF THE DISCLOSURE

A resilient bushing of the type used in the front eye of the leaf spring of an automobile is composed of a pair of rigid concentric sleeves with an elastomeric insert radially compressed therebetween. The surface of the insert in contact with the outer sleeve is provided with a pair of radially opposed recesses, the axial length of which differ from one another, whereby the spring rate of the bushing in the direction of one of the recesses is different than that in the direction of the other, and both rates are lower than the spring rate in the axial plane normal thereto.

BACKGROUND OF THE INVENTION

For many years, elastomeric materials have been used for among other uses, the isolation of vibration between structural components. In this capacity, the materials have been used in many different arrangements and shapes. With the advances of technology, various improvements have been made in the design of the isolation members. One of these improvements includes the use of rubber to permit relative rotational movement between two members. In this application, the rubber is typically inserted between a pair of concentric rigid sleeves, the inner sleeve connected to one of the members and the outer sleeve affixed to the other member, this construction being typically referred to as a bushing. It was then found that the properties of a bushing could be further improved by radially compressing the rubber between these two sleeves. The restorative tendencies of the rubber under compression serve to hold it in place and to resist slipping between it and one or the other of the sleeves. Furthermore, larger loads could be accommodated using such a construction.

Elastomeric bushings of this type are commonly used on vehicles such as automobiles to permit relative motion between the parts while isolating vibration and sound from the passenger compartment. Because of the continued striving for smoother, more comfortable rides, and with the advent of high-speed, smooth highways, the functional demands on these various bushings and vibration isolators have continued to increase. Among these demands are the isolation of specific frequencies of types of vibrations or sounds, or the isolation of the given range of frequencies in one direction of movement and a different range in another direction. An example of this type of bushing is described in the Wolf patent, U.S. 3,147,964, issued Sept. 8, 1964, and assigned to the assignee of the present invention. That bushing is described as a closed-end variable rate bushing, typically used in the front suspension of an automobile, and comprising an elastomeric insert having end portions compressed between, and in firm contact with the inner and outer sleeves, and the portion intermediate of the end portions containing a pair of equally sized, diametrically opposed recesses. These recesses have a length corresponding to between one-half and two-thirds the length of the bushing. Each recess serves to reduce the amount of rubber that is in contact with the outer sleeve at that location and results in a spring rate that is substantially less than that in the axial direction perpendicular thereto where there is solid contact between the rubber and the sleeve.

SUMMARY OF THE INVENTION

An object of the present invention is to provide a bushing constituting an improvement over that shown and described in the aforementioned Wolf patent;

Another object is to provide a bushing giving an improved performance particularly when utilized in the front eye of a leaf spring; and A further object of this invention is a triple-rate bushing comprising an elastomeric insert radially compressed between a pair of rigid, preferably metal, sleeves, and characterized by a pair of diametrically opposed recesses in the radial outer surface, the cross-sectional area of one recess differing from the corresponding area of the other by a factor of at least about 1.5 to 1.

BRIEF DESCRIPTION OF THE DRAWINGS

These and other objects are accomplished in the manner to be hereinafter described in detail with particular reference to the drawings, in which:

FIGURE 1 is a cross section through a rubber insert as molded;

FIGURE 2 is another cross-sectional view of the molded insert, taken at right angles to that of FIGURE 1;

FIGURE 3 is a view of an assembled bushing partially in cross section;

FIGURE 4 is a cross-sectional view of the front eye of a leaf spring, with the bushing mounted therein;

FIGURE 5 is a cross-sectional view taken through the larger recess 12A of FIGURES 3 and 4 along line 5—5 thereof; and FIGURE 6 is a cross-sectional view taken along line 6—6 of FIGURES 3 and 4 showing the smaller recess 12B.

DETAILED DESCRIPTION OF THE INVENTION

The present invention relates to a bushing that is so designed as to provide outstanding dynamic characteristics in three radial directions by the advantageous use of properly dimensioned recesses on the radially outer surface of the elastomeric insert. The use of these recesses results in the creation of voids between the surface of the elastomer and the outer sleeve, giving rise to differences in the amount of rubber available to be compressed when the outer and inner sleeves move relative to another in the radial direction.

For a more comprehensive explanation of the invention, reference is now made to the appended drawings wherein FIGURES 1 and 2 show the cross-sectional shape of an elastomeric insert as it would appear upon being removed from a mold and before being assembled into a bushing.

The body 2 of the elastomer is provided with an annulus 4 extending axially therethrough. The ends 6 of the insert are dish shaped and slightly concave. In proximity to the ends 6 and connected thereto by suitable shoulder 8 is a pair of circumferentially continuous lands 10. Between these lands are a pair of recesses 12a, 12b. As seen in FIGURE 1, the upper recess 12a extends from one land to the other whereas the lower recess, 12b is separated from the lands by an intermediate plateau 14. It is noted in FIGURE 2 that this plateau extends around the entire circumference of the bushing except in the region of the larger recess 12a. When assembled, this plateau is normally in contact with the inner surface of the outer metal sleeve. Even though the axial length of recess 12a is greater than that of 12b, it is noted, in FIGURE 2, that angular dimensions and the depth of the two recesses are approximately the same.

Referring now to FIGURE 3, there is seen an insert 2 of the type shown in FIGURES 1 and 2, assembled between an outer sleeve 20 and an inner sleeve 22. Both of these sleeves are preferably metal, and, as shown, are circular. The inner sleeve 22 is normally substantially thicker than the outer sleeve to accommodate the greater stresses, per unit area, to which it is subjected. Inasmuch as FIGURES 1, 2 and 3 are all drawn to the same scale, it can be readily noted that the outer diameter of the elastomeric insert as molded is appreciably greater than the inner diameter of the outer sleeve 20, and the annulus 4 is smaller than the outer diameter of the inner metal of 22. Thus it is obvious that the insert must be radially compressed to assemble it between the two sleeves, this compression resulting in a certain amount of axial elongation. Normally, the assembled length of the insert is at least 10 percent greater than that of the insert as molded. The shoulders 8 of the insert, as molded, are tapered to facilitate the assembly of the insert into the outer sleeve. Upon assembly, the concave ends 6 of the insert become substantially planer. Each land is in circumferentially continuous contact with the outer sleeve resulting in a closed-end construction. The two recesses 12A, 12B cooperate with the outer sleeve 20 to form two pockets 24A and 14B.

FIGURES 5 and 6 are views taken through the two pockets 24A and 24B of the bushing immediately beneath the peripheral surface of the insert 1 looking toward the inner surface of the outer sleeve 20. The dimensions $b,b'$ of the pockets 24A and 24B taken in the circumferential direction, i.e. around the perimeter of the bushing in a plane that is perpendicular to the axis of the bushing, are equal. However, the dimensions $a,a'$ of two pockets in the axial direction are unequal with dimension $a$ being at least about 1.5 times as large as dimension $a'$. Thus, the area $(ab)$ of the pocket 24A at the surface of the outer sleeve 20 is at least 1.5 times the area $(a'b')$ of the pocket 24b.

Referring now to FIGURE 4, a bushing of the type shown in FIGURE 3 is assembled into the front eye of a leaf spring 30 of an automobile or the like, the bushing comprising an outer metal sleeve 32, an inner metal sleeve 34 and a rubber insert compressed therebetween. The bushing is typically dimensioned so that the outer sleeve is press fitted into the eye of the spring. A bolt 38 passing through the inner sleeve connects the spring to a bracket (not shown) attached to the frame of the vehicle. The bushing is assembled in such a manner that the two recesses are toward the front and the rear of the vehicle (hereinafter referred to as the fore and aft positions) with the larger recess 12a located in the fore position.

In the vertical plane through the bushing, the entire space between the inner and outer sleeves is occupied by the elastomer. Thus, relative movement between the sleeves in the vertical direction A is resisted by a maximum amount of rubber. The bushing is thus able to accommodate the relatively fixed static load representing the weight of the vehicle and the dynamic loads in the vertical direction A. On the other hand, the minimum amount of resistance between the inner and outer sleeves is obtained in the fore direction B where the larger of the two recesses results in a minimum amount of rubber interposed between the two sleeves. This results in maximum compliance in the fore position, representing the initial deflection in the horizontal plane.

Diametrically opposed to the larger recess 12a is the smaller recesss 12b, where there is correspondingly more rubber between the two sleeves. This results in more resistance to radial movement between the two sleeves in the aft position C to accommodate rebound deflection in this direction. This differential in resistance between the fore and aft positions of the bushing results in, among other things, a rapid deadening of vibration.

If used in the environment of FIGURE 4, the bushing is subjected to torsional deflection, i.e., rotation of the outer and inner sleeves relative to one another about the bushing axis, of about ±10°. When used with a lesser amount of torsional deflection along with very light radial and dynamic loads, bonding of the elastomeric insert to either of these sleeves is normally unnecessary. However, under more severe conditions of torsional deflection and axial thrust, plus higher radial and dynamic loads, it is contemplated that the elastomer should be bonded to one or both sleeves using a suitable cement or the like.

As previously explained, the differential spring rates are obtained by maintaining a differential in the cross-sectional area of the recesses as measured at the interface of the periphery of the insert and the outer sleeve. This differential in size, in order to produce a noticeable difference in spring rate, is normally on the order of 1½ to 1 or greater. It is contemplaed that, under normal circumstances, the angular width of the recesses will be the same, and will fall within the range of about 60 to 90°. Thus, the differences in cross-sectional area are achieved by varying the length, in the axial direction, of the recesses. Normally, the larger recess will be between ½ and ⅔ of the length of the insert. Each recess is sufficiently deep to prevent the outer metal, under severe radial load, from contacting the bottom of the recess. Normally, but not necessarily, the depth of the two recesses is equal.

In order to more fully explain the invention, without the intention of being limited thereby, the following examples are presented.

Example 1

A rubber compound was prepared by masterbatching 100 parts of #1 smoked sheet with 14 parts of channel black as well as minor amounts of an appropriate activator, retarder and plasticizing agent, in a Banbury mixer. A curing agent, accelerators and an antioxidant were then thoroughly blended into this masterbatch.

A rubber insert was then prepared from this compound by injection molding and was cured at elevated temperatures. This insert, as molded, had an axial length of about 2.5 inches and a maximum diameter of about 2.18 inches. It was provided with an annular bore of about .45 inch. A pair of diametrically opposed recesses were provided on the outer periphery of the insert, both recesses having a radial width of 74° and a depth of about .30 inch. The axial length of one recess was about 1.3 inches with the length of the other recess being about .8 inch. as measured along the peripheral surface of the insert. The insert had a hardness of about 52 Durometer.

The bushing was assembled on a standard vertical assembly machine by first forcing the rubber into the outer metal and then, by use of a tapered mandrel, forcing the inner sleeve into the rubber, using a suitable lubricant for both steps. The bushing was then allowed to age for a period of time between 24 to 48 hours and was then heated to a temperature of about 285° F. to bond the rubber to the sleeves. The inner and outer sleeves had previously been coated with a suitable cement prior to assembly, said cement being activated at the elevated temperature.

The dimensions of the assembled components are as follows. The outer diameter of the inner sleeve was approximately .75 inch, and the inner diameter of the outer metal was about 1.93 inches. The inner metal had a length of slightly more than 3 inches; while the length of the outer sleeve was about 2.5 inches.

The assembled bushing was placed in a dynamic shaker and the various dynamic spring rates and damping coefficients were measured. A spring rate of 6,845 pounds per inch and a damping coefficient of 4.09 were obtained along the axial plane perpendicular to the pockets formed by the recesses and the outer sleeve. A value of 4,418 pounds per inch and a coefficient of 3.16 were obtained in the direction corresponding to the larger of the two recesses, and a rate of 4,724 per inch and a coefficient of 3.53 were obtained in the opposite direction corresponding to the smaller recess.

Example 2

A rubber insert was prepared from a composition similar to that of Example 1 except that a greater amount of carbon black was used, resulting in a Durometer of 58 for the cured insert. The dimensions of the insert and the assembly were the same as that of Example 1. The various dynamic spring rates and damping coefficients of the assembled bushing are as follows:

|  | Spring rate | Damping coefficient |
|---|---|---|
| Solid (A direction) | 8,049 | 5.85 |
| Larger recess (B direction) | 5,102 | 5.07 |
| Smaller recess (C direction) | 5,659 | 5.32 |

It can be readily observed that the spring rate and the damping coefficient both increase with the hardness of the rubber and are dependent upon the amount of rubber that is undergoing compression between the two sleeves.

It should be understood that various changes can be made in the design and construction of this bushing without departing from the scope of the invention. For example, the insert and outer sleeve can be provided with one or two radially outwardly extending flanges in accordance with existing engineering practices where axial alignment and movement are critical. Furthermore, the bushing, instead of being round, can be oval as shown for example, in the aforementioned Wolf patent. Other changes can likewise be made in the dimensions, materials, and design while practicing this invention.

The sleeves are preferably fabricated from metal although it is contemplated that rigid polymeric materials may be used insteat. Natural rubber is a suitable material for the insert. However, other elastomers such as Butyl rubber, neoprene (polychloroprene), ethylene propylene rubber and SBR may be used. Typically, the elastomer, in order to be useful for this purpose, should have a hardness of between 40 and 65 Durometer.

Although the compounding techniques used in preparing the elastomeric inserts and the various treatments and assembly operations are important to the complete understanding of this invention, they do not comprise a part of the invention, which is delimited solely by the scope of the claims that follow.

I claim:

1. In a resilient bushing comprising inner and outer axially aligned, radially spaced apart, rigid sleeves defining an annular space therebetween, a molded rubber insert compressed between the two sleeves with the curved periphery of the insert in pressure contact with the inner surface of the outer sleeve, the insert having larger and smaller diametrically opposed recesses extending radially in from the periphery thereof, said recesses cooperating with the outer sleeve to form a pair of enclosed pockets, the radial depth of the two pockets being substantially equal and the surface area of the larger recess at the outer periphery of the insert being at least about 1.5 times as large as the surface area of the smaller recess.

2. The bushing according to claim 1 wherein the axial length of the larger recess, as measured at the inner surface of the outer sleeve is at least about 1.5 times as great as the axial length of the smaller recess.

3. The bushing according to claim 2 wherein the dimensions of the two recesses around the curved perimeter of the bushing are equal.

References Cited

UNITED STATES PATENTS

| 1,532,541 | 4/1925 | Masury. | |
| 1,540,500 | 6/1925 | Reed. | |
| 2,061,767 | 11/1936 | Hobson | 105—197 |
| 3,147,964 | 9/1964 | Wolf. | |

FOREIGN PATENTS

| 1,033,047 | 6/1958 | Germany. |

ARTHUR L. LA POINT, Primary Examiner

H. BELTRAN, Assistant Examiner

U.S. Cl. X.R.

267—30, 54, 63

PO-1050
(5/69)

UNITED STATES PATENT OFFICE
CERTIFICATE OF CORRECTION

Patent No. 3,508,745      Dated 4-28-70

Inventor(s) Donald L. Deane

It is certified that error appears in the above-identified patent and that said Letters Patent are hereby corrected as shown below:

Column 3, line 24, "14B" should be -- 24B --. Column 4, line 15, "contemplaed" should be -- contemplated --. Column 5, line 33, "insteat" should be -- instead --.

SIGNED AND
SEALED
AUG 25 1970

(SEAL)
Attest:

Edward M. Fletcher, Jr.
Attesting Officer

WILLIAM E. SCHUYLER, JR.
Commissioner of Patents